April 15, 1969 A. POLLAK 3,439,115

KEYED AUTOMATIC GAIN CONTROL CIRCUIT FOR TELEVISION RECEIVERS

Filed May 27, 1965 Sheet 1 of 2

Inventor:
Alfred Pollak
By Spencer & Kaye
Attorneys

Inventor:
Alfred Pollak
By: Spencer & Kaye
Attorneys

United States Patent Office 3,439,115
Patented Apr. 15, 1969

3,439,115
KEYED AUTOMATIC GAIN CONTROL CIRCUIT FOR TELEVISION RECEIVERS

Alfred Pollak, Hannover, Germany, assignor to Telefunken Patentverwertungsgesellschaft m.b.H., Ulm (Danube), Germany Filed May 27, 1965, Ser. No. 459,290
Claims priority, application Germany, May 30, 1964, T 26,283
Int. Cl. H04n 5/54
U.S. Cl. 178—7.3 9 Claims

ABSTRACT OF THE DISCLOSURE

A keyed automatic gain control circuit for television receivers and including a keyed amplifying element whcih is arranged to produce an automatic gain control voltage that is a function of the amplitude of the synchronizing pulses of the received video signal, the keyed element being connected to be responsive to the synchronizing pulses only when those pulses are in synchronism with keying pulses so that the element is not responsive to any other portion of the video signal.

The present invention relates to a control arrangement for use in television receivers, and more particularly to an automatic gain control (A.G.C.) circuit.

In order to provide a gain control voltage in television sets, it is known that the video signal can be fed to the control grid of an amplifier tube, the anode of which is periodically driven by flyback pulses derived from the horizontal sweep circuit. Such systems are known as keyed automatic gain control systems. In this type of system, the "keying" of the anode of the amplifier tube greatly limits the interfering effect of noise pulses on the amplitude of the gain control voltage.

In another known arrangement, a D.C. control voltage produced by rectifying the video signal is fed to an amplifying stage, the anode of which is driven by flyback pulses in such a way that an amplified, negatively directed, gain control voltage appears at the output of this tube. All such conventional circuit arrangements have relatively high-impedance output circuits, although a low-impedance output circuit is much more desirable for many applications. This is especially advantageous when a transistor amplifier is to be controlled without an additional impedance converter between it and the A.G.C. tube.

It has also been proposed that the video signal be fed to the control electrode of an amplifier along with locally generated unipolar pulses synchronized with the video signal. In this manner, the amplifier would normally be blocked and would be driven to its conductive state by the locally generated pulses. The amplified pulses so produced would be rectified to produce a control voltage.

However, the last-mentioned arrangement as well as those previously mentioned have been deficient in several regards. One disadvantage, for example, has been that the scanning pulses arrive delayed when the set is switched on, so that no control voltage whatsoever is produced and the controlled amplifier stages are highly over-modulated. This causes overloading of the tubes (for example, the last IF stage) and a highly distorted sound output. A further disadvantage is the occurrence of beats on the control voltage when the synchronizing circuit falls temporarily out of step. Such beats amplitude-modulate the video signal, blocking the amplifying elements of the sync separating circuit, so that the synchronization is disturbed. In order to eliminate such interference, it is possible to install devices which suppress the initial hum when the set is switched on by blocking the sound channel until the scanning pulses are present. It is also possible to install a diode in such keyed A.G.C. systems in order to avoid overdriving the controlled amplifying stages when the scanning pulses fall out of synchronization. Such diode blocks the white picture content during gaps in the synchronizing pulses. In order to prevent amplitude modulation of the video signal, the control time constant must be preset, and can not be adjusted to meet varying requirements. To prevent initial switch-on humming, it is also possible to use a circuit which shunts off the scanning pulses from the line oscillator, since the latter are present early enough after switching-on to provide a source of sync pulses shortly after the set is switched on.

With the above-mentioned defects of the prior art in mind, it is an object of the present invention to provide a keyed automatic gain control system for television receivers which eliminates such defects of prior art systems at no added expense, and which renders the set operative immediately after it is turned on.

This, as well as other objects, are achieved according to the invention in a keyed automatic gain control system for television receivers wherein locally generated keying pulses are fed to a normally blocked keying device in synchronism with the synchronizing pulses from the video signal, so that the keying device is driven into conduction by such locally generated pulses. In this circuit arrangement, the locally generated keying pulses are amplified and processed so that they have a polarity opposite to that of the synchronizing pulses and an amplitude greater than the peak amplitude of the synchronizing pulses. The control voltage generated by the keying device is used to control at least one of the video amplifying stages.

Additional objects and advantages of the present invention will become apparent upon consideration of the following description when taken in conjunction with the accompanying drawings in which.

Figure 1:
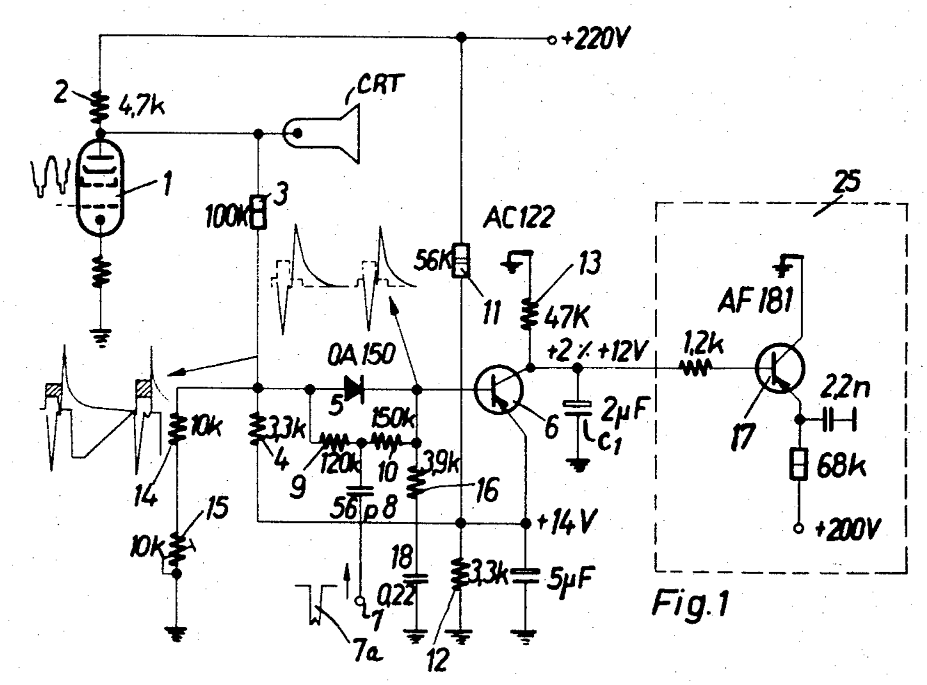
FIGURE 1 is a schematic of a keyed automatic gain control circuit according to the present invention.

Referring specifically to the drawings, in the autoamtic gain control circuit of FIGURE 1, a video amplifying tube 1 is shown, to the control grid of which the video signal is fed. The waveform appearing at this grid includes negatively directed synchronizing pulses. The amplified video signal appears at the anode resistor 2 of the video amplifier tube, along with positively directed synchronizing pulses. The tube 1 is biassed in such a way as to limit interfering noise pulses which might occur and which exceed the peak amplitude of the synchronizing pulses.

The video signals are fed both to a picture tube (CRT) and to the base of a transistor 6 via a voltage divider 3, 4, both to reduce the amplitude of the output of tube 1 and to partially decouple the transistor input from the tube. The transistor 6 is the above-mentioned keying device. The voltage available at the voltage divider 3, 4, is fed to the base of transistor 6 through a diode 5, the break point of which is set at a "gray-level value," slightly below the black-level value (i.e., that voltage in the video signal waveform at which the electron beam is cut off, usually about 75% of the maximum signal amplitude). Thus, only that portion of the video waveform higher than this level can reach the base of transistor 6, and there is no chance of its being turned on by a low-level portion of the waveform. The synchronizing pulses, being positive, only drive the transistor 6 further into its blocked condition. This is accomplished by a leakage resistance network which includes resistor 16, condenser 18 and a pair of resistors 9, 10, in series with a capacitor 8. In effect condenser 18 is shunted across resistors 9, 10. The resistors 9 and 10 are effectively bridged by capacitor 18, while resistor 16 is not so bridged. Both the anode and cathode of diode 5 are connected through terminal 7 with the output stage of the horizontal sweep circuit so that they receive from such output stage a sequence of flyback or blanking pulses 7*a*. This keying pulse train 7*a* is differentiated as it is passed through capacitor 8 and resistors 9 and 10, so that the negative impulse produced by the leading edge of each blanking pulse is in phase with the leading edge of the positive synchronizing pulse which occurs at that point. The free end of resistor 4, which forms part of the above-mentioned voltage divider, is connected to a further voltage divider which includes resistors 11 and 12, and which also provides a bias voltage of, e.g., 14 volts, to the emitter of transistor 6. The collector of transistor 6 is grounded through a resistor 13. In this manner, the video signal is made to appear at the output of keying transistor 6 only during the time interval between the differentiated flyback pulses 7*a*, mainly through the action of resistors 4 and 16. The (negative) amplitude of the keying pulses is chosen such that, considering the values of resistors 14 and 15, the keying transistor 6 is driven into conduction during the coexistence of the keying pulses and the synchronizing pulses from the video waveform.

The temperature sensitivity of the circuit described, due to heating in the keying transitsor, is low. Any possible dependence on the ambient temperature can be compensated by a corresponding temperature coefficient of differentiation capacitor 8.

It is extremely important that the diode 5 be controlled simultaneously at both its anode and its cathode by keying pulses 7*a*, since otherwise this diode can not function properly. If a negative pulse is only applied to the anode of the diode, the diode would be an open circuit and would block the scanning pulse from reaching the base of transistor 6. If the negative pulse were applied only to the cathode of diode 5, the resistor 16, part of the differentiating circuit, would not have the proper effect. This is clear from the fact that when the diode is a short circuit, then resistors 4 and 16 appear in parallel; when diode 5 is blocked, only resistor 16 is effective in the circuit, which would cause the modulation voltage to increase at just that moment when it should be low, so that it can properly control keying transistor 6. The advantage thus obtained according to the present invention by separating the picture content would be lost. When the modulation voltage is applied to both the anode and cathode of diode 5 at the same time, the voltage is increased during the duration of the pulse, although not during the gap between pulses, at the cathode of the diode, since the second differentiation path is switched off.

To briefly review the operation of the circuit arrangement described herein, the video waveform is clipped to remove that portion below a given level, and the remainder is applied to the control electrode of a keying element, which in this case is transistor 6. This transistor is maintained in its blocked condition by the positive waveform descrbed, which contains positiively directed synchronizing pulses. A negative series of keying pulses, occurring normally simultaneously with the synchronizing pulses, is also applied to the control electrode of the keying element, which series is balanced against the synchronizing pulses and which, during the duration of such pulses, drive the transistor 6 into conduction. Therefore, the control current in the collector circuit of transistor 6 is inversely proportional to the amplitude of the synchronizing pulses in the video waveform. The capacitor C1 is charged, between the keying pulses, to a control level. The rate of change in the charge level of control capacitor C1, during the keying pulses, is proportional to the control voltage so that the average D.C. bias current flowing in the controlled amplifier stage 25 is reduced as the voltage on the control capacitor increases, thus increasing the amplification of the stage 25. At high synchronizing pulse amplitudes, therefore, the control current is low, so that the amplification of stage 25 is relatively low. At low synchronizing pulse amplitudes, on the other hand, the control current is high, so that amplication is increased to compensate for the reduction in the video signal amplitude.

By using the circiut arrangement described above, as an overmodulation protection circuit, a control voltage can be produced even when the scanning pulses are not in synchronism. As previously mentioned, if the control voltage depends on the picture content, the video signal would be overmodulated and would thus interfere with the synchronization circuits, which would be incapable of synchronizing the scanning pulses.

A further amplifier 25, which is the amplifier to be controlled by the control voltage, may advantageously be a pnp-transistor, since the transistor 6 is a pnp-transistor in the embodiment described. The amplifier stage 25 is controlled by changing its D.C. emitter bias by means of transistor 6; the amplification of transistor 17 increases as the control voltage increases. In addition, the circuitry illustrated allows a direct coupling between the output of transistor 6 and the base of the controlled transistor amplifier 17. If, in the circuit illustrated, different types of transistors were used, the wrong direction of control would be obtained. In order to increase the slope of the control characteristic, the transistor 6 may be connected through a pulse amplifier, so that the amplified pulses are delivered to a rectifier (not shown) which is connected to the emitter of the controlled transistor 17. By this means, a negative feedback effect due to the changing emitter voltage is eliminated. The control voltage is to some extent dependent on the picture content, due to the necessity of a separation diode (specifically, to the necessarily finite value of leakage resistors 9 and 10 in circuit with capacitor 18). This dependency is compensated by connecting the voltage divider 3, 4, to the emitter of the keyed rectifier, so as to produce a compensating voltage at the emitter directed oppositely to the video signal voltage. The two divider currents (that through resistors 11 and 12, and the one through resistors 3, 4 and 12) are chosen in such manner that the black-level value transmission is as desired.

With the arrangement described above, it is impossible for the controlled amplifier (25) to be overmodulated when the receiver is switched on, because the control voltage is maximum in the blocking direction when the scanning pulses 7*a* are not present. In other words, in the absence of scanning pulses 7*a*, since the keying transistor 6 is blocked, the amplification of the controlled amplifier 25 is at a minimum. In the circuit described above, in order to avoid overmodulation during operation when the scanning pulses are out of synchronism, the diode circuit (elements 5, 9, 10, 16 and 18) is used. Beats which occur on the control voltage when the scanning pulses are out of synchronism almost never occur, since during pulse gaps the control capacitor maintains its full charge since the transistor 6 becomes more conductive during these pulses due to the negative peaks on its base. In previously used arrangements, the voltage was always lowered at such instances. In a normal center-tapped key modulator circuit, the control capacitor is discharged during such pulse gaps and is only charged when the synchronizing and keying pulses occur simultaneously. In the present circuit arrangement, on the other hand, the control capacitor C1 which is connected to the collector is charged in the gaps between the pulses, and is only slightly discharged during the concurrent synchronizing and scanning pulses, since the capacitor discharge time constant is increased by the high impedance of the transistor, and the time allowed for discharging is very short.

Figure 2:
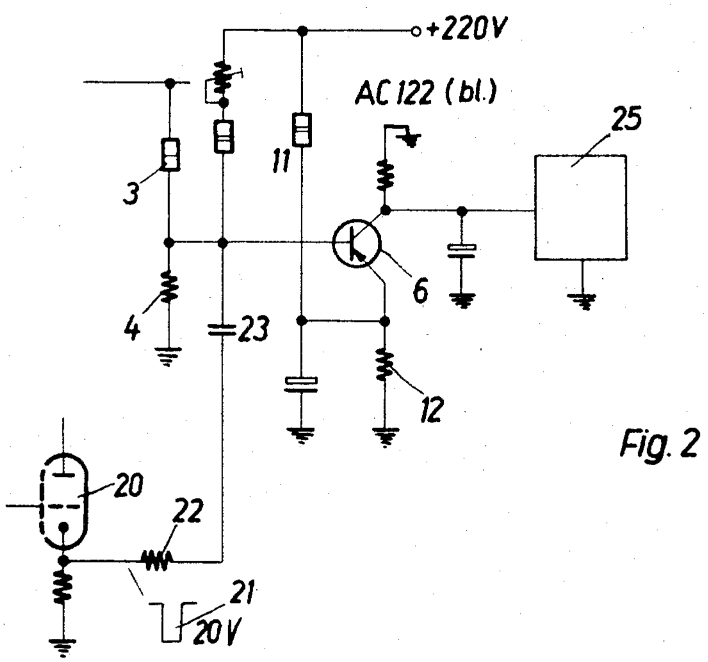
FIGURE 2 is a schematic of a slightly simplified version of a circuit similar to that of FIGURE 1, in which analogous circuit elements have the same reference numerals.

FIGURE 2 shows a simplified circuit, the elements of which are numbered analogously to those in FIGURE 1. In the heretofore described keying system, the amplifier 6 amplifies only when the keying pulses, derived from the horizontal sweep circuit, are present. It is also possible to use the synchronizing pulses in the video waveform themselves as keying pulses. For this purpose, two voltages are fed to transistor 6, (1) positively directed synchronizing pulses from the video signal through voltage divider 3, 4; and (2) synchronizing pulses 21, inverted to have a negative polarity by pulse separating stage 20. In this case, as in FIGURE 1, resistor 22 and capacitor 23 act as a pulse differentiator. In the circuit of FIGURE 2, there is no need for a device to protect against overmodulation, since it is not possible for the keying pulses to be out of synchronism. This circuit is, however, slightly more susceptible to malfunction than the arrangement of FIGURE 1 since the additional pulses may also be interfered with.

Figure 3:
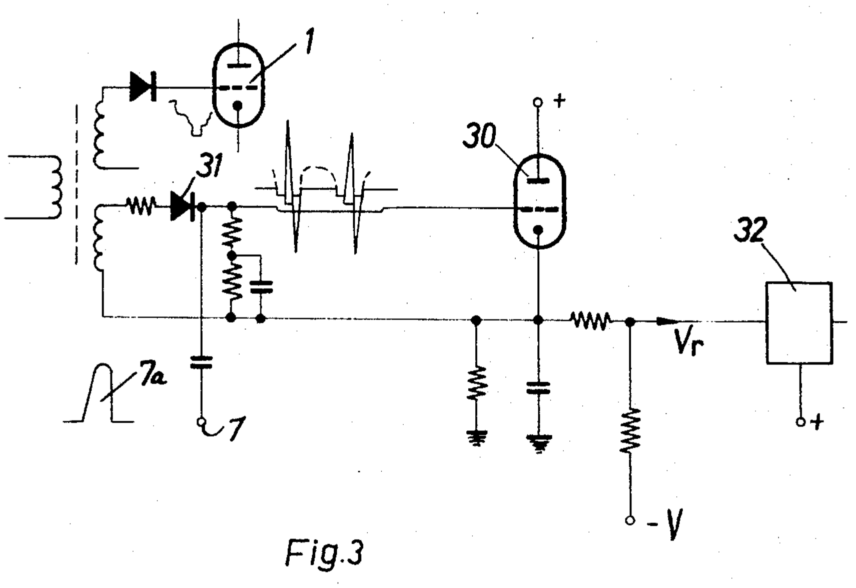
FIGURE 3 is an example of a circuit in which an amplifier tube is used as a keying device.

FIGURE 3 illustrates an example of a tube 30 used as a keying element, rather than a transistor. In order to obtain the correct direction of control, the grid potential of this circuit floats on the cathode potential, which is the control voltage. For this purpose, the video signal is fed to the grid circuit through an inductive coupling. A video signal rectifier 31 separates out the picture content at the gray-level value. The control range required is only obtained by connecting the cathode circuit of tube 30 to a negative potential, or by raising the potential of the controlled stage 32 to a positive level.

It will be understood that the above description of the present invention is susceptible to various modifications, changes and adaptations, and the same are intended to be comprehended within the meaning and range of equivalents of the appended claims.

What is claimed is:

1. A circuit arrangement for producing a gain control voltage in a television receiver, in which circuit arrangement keying pulses are fed in sychronism with the synchronizing pulses of the video signal to a normally blocked keyed element, which is driven into conduction by such keying pulses, and in which circuit arrangement the synchronizing pulses are amplified and rectified for producing a control voltage, so that said keying pulses have a polarity opposite to that of the rectified synchronizing pulses of the video signal and an amplitude greater than the peak value of the amplitude of the amplified synchronizing pulses; said circuit arrangement including a keyed element, a video signal source, a rectifier connected between the video signal source and the keyed element for passing only that part of the picture content greater in amplitude than its gray-level value, and a leakage resistance for controlling said keyed element and including two resistive elements connected in series across said rectifier, a capacitor bridging said resistive elements, and feeding means connected to a point between said resistive elements to supply said keying pulses thereto for enabling said keying pulses to control said rectifier simultaneously at both its anode and its cathode.

2. A circuit arrangement as defined in claim 1 further including a source of flyback pulses and a capacitor in said feeding means for differentiating the flyback pulses to provide said keying pulses.

3. A circuit arrangement as defined in claim 2 wherein said video signal source includes a voltage divider in its output circuit, the anode of said rectifier being connected to the output of said voltage divider.

4. A circuit arrangement as defined in claim 3 wherein said video signal source is a video amplifier tube and said keying element is a transistor, said voltage divider including two resistors connected in series between the output of the video amplifier tube and the emitter of said keying element.

5. A circuit arrangement for producing a gain control voltage in a television receiver, said circuit arrangement comprising, in combination:

a source of video signals, including synchronizing pulses;

a source of keying pulses synchronized with, and opposite in polarity to, said synchronizing pulses;

means connected to said source of video signals for clipping out all of the video signal fed to it below a predetermined gray-level amplitude, which amplitude is slightly below the black-level value;

keyed means responsive to said keying pulses and connected to said clipping means for emitting an output signal proportional to the video signal fed thereto only during the duration of each of said keying pulses; and means connected to form an output circuit for said keyed means and including a control capacitor connected so that the voltage across it is in part controlled by said output signal, and means electrically connected to said capacitor for charging said control capacitor toward a steady state level in the absence of said keying pulses and for decreasing the voltage across the control capacitor during the interval of each keying pulse by an amount proportional to the value of said keyed means output signal, making the average voltage across the control capacitor an inverse function of the video signal amplitude present during the keying pulses.

6. A circuit arrangement as defined in claim 5 wherein said keyed means is a transistor and said output circuit includes a resistor and said control capacitor connected in parallel with the collector circuit of the transistor, said charging means including a further transistor amplifier stage of the same type as the keying transistor, the input terminals of said further amplifier stage being connected in circuit with said control capacitor so that the voltage across said control capacitor determines the operating point of the further amplifier stage.

7. A circuit arrangement as defined in claim 6 wherein said source of video signals is a video signal amplifying tube, said tube including two resistors in series in its output circuit forming a voltage divider, one end of said voltage divider being connected to the output terminal of said tube and the other end of said voltage divider being connected to the emitter terminal of said keying transistor.

8. A circuit arrangement as defined in claim 7 wherein said clipping means is a diode connected between the juncture of said two resistors and the base terminal of said keying transistor, said source of keying pulses including means for differentiating flyback pulses derived from the horizontal sweep circuit of such television receiver and applying the differentiated pulses simultaneously to both the anode and the cathode of said diode, so that the negative pulses produced from the differentiation of the leading edge of each of the flyback pulses key the keying transistor into its conductive state.

9. A circuit arrangement for producing a gain control voltage in a television receiver, in which circuit arrangement keying pulses are fed in synchronism with the synchronizing pulses of the video signal to a normally nonconductive keyed element which is driven into conduction by a voltage having the polarity of such keying pulses, and in which circuit arrangement the synchronizing pulses are amplified and rectified for producing a control voltage and the keying pulses have a polarity opposite to that of the rectified synchronizing pulses of the video signal and an amplitude greater than the peak value of the amplitude of the amplified synchronizing pulses, said circuit arrangement comprising, in combination: a keyed element; a video signal source; first conductor means connected between said video signal source and said keyed element for conducting the amplified and rectified synchronizing pulses of the video signal to said keyed element; inverter means connected to receive such amplified and rectified synchronizing pulses, for separating these pulses from the rest of the video signal and for inverting the polarity of such pulses; differentiating means connected to said inverter means for differentiating the inverted pulses; and second conductor means connected between said differentiating means and said keyed element for feeding the output of said differentiating means to said keyed element, the output of said differentiating means constituting said keying pulses; whereby said keyed element produces an output which is proportional to the amplitude of the amplified and rectified synchronizing pulses only during the occurrence of keying pulses.

References Cited

UNITED STATES PATENTS

| | | | |
|---|---|---|---|
| 3,225,139 | 12/1965 | Massman | 178—7.3 |
| 3,320,362 | 5/1967 | Shimada et al. | 178—7.3 |
| 2,977,411 | 3/1961 | Goodrich | 178—7.3 |

ROBERT L. GRIFFIN, *Primary Examiner.*

ALFRED H. EDDLEMAN, *Assistant Examiner.*